United States Patent [19]

Aoki et al.

[11] 4,367,300

[45] Jan. 4, 1983

[54] SYNTHETIC RESIN COMPOSITIONS TO BE ADDED TO CEMENT, AN AQUEOUS PAINT COMPOSITION CONTAINING SAID COMPOSITIONS AND A METHOD FOR COATING SAID PAINT COMPOSITION

[75] Inventors: Akiji Aoki, Itsukaichi; Terusato Inoue, Tokyo, both of Japan

[73] Assignee: Kowa Chemical Industries Co., Ltd., Tokyo, Japan

[21] Appl. No.: 212,495

[22] Filed: Dec. 3, 1980

[30] Foreign Application Priority Data

Dec. 14, 1979 [JP] Japan .................. 54-161578
May 20, 1980 [JP] Japan .................. 55-65938

[51] Int. Cl.³ .............. C08K 3/34; C08F 212/08; C08F 220/10
[52] U.S. Cl. .......................... 524/2; 524/4; 524/8
[58] Field of Search ............ 260/29.6 PS, 29.6 S, 260/29.6 MN; 424/2, 4, 8

[56] References Cited

U.S. PATENT DOCUMENTS

| | | | |
|---|---|---|---|
| 3,738,991 | 6/1973 | Reed | 260/29.6 PS |
| 3,865,774 | 2/1975 | Malone | 260/29.6 S |
| 4,202,809 | 5/1980 | Eash | 260/29.7 S |

*Primary Examiner*—John Kight, III
*Assistant Examiner*—Amelia B. Yarbrough
*Attorney, Agent, or Firm*—Silverman, Cass & Singer, Ltd.

[57] ABSTRACT

Rust preventing synthetic resin compositions to be added to cement or mortar, which have high strength, adhesion and waterproof, contain 0.05~5 parts by weight of a primary alkanol-amine having 2 to 8 carbon atoms based on 100 parts by weight of resin solid content in a synthetic resin emulsion.

7 Claims, No Drawings

SYNTHETIC RESIN COMPOSITIONS TO BE ADDED TO CEMENT, AN AQUEOUS PAINT COMPOSITION CONTAINING SAID COMPOSITIONS AND A METHOD FOR COATING SAID PAINT COMPOSITION

The present invention relates to synthetic resin emulsion to be added to cement or mortar, aqueous paint composition obtained by adding the synthetic resin emulsion to cement or mortar mixture and a method for coating said paint composition.

Heretofore, in order to improve various properties of cement or mortar, such as strength, adhesion, waterproof and the like, natural rubber latex and synthetic rubber latexes, such as styrene butadiene latex, polychloroprene latex, acrylonitrile butadiene latex etc, or emulsions, such as polyvinyl acetate resin emulsion, ethylene-vinyl acetate copolymeric resin emulsion, polyacrylate emulsion etc. have been admixed in cement or mortar. The cement (or mortar) mixtures added with these various synthetic resin emulsions, that is, polymer cements can form coated films having excellent waterproof and adhesion by applying the cement or mortar mixture on surface of mineral structures, such as concrete plate, concrete block, concrete wall, mortar wall, slate plate, stone material etc. surface of wood plates or structures, such as veneer plate, hardboard plate, or surface of metal structures, such as iron plate. However, when such a cement mixture is coated on a metal structure surface, the strength of the metal is deteriorated or the coating surface is stained by corrosion of the metal and there has been a great problem in the maintenance of the structures.

The inventors have made a variety of studies with respect to these problems and have made investigation with respect to various additives in order to improve the adhesion and rust preventing activity of the polymer cement. As the result, it has been found that the rust prevention can be improved without deteriorating the properties of the prior polymer cement by adding aminoalcohol. Furthermore, it has been found after a variety of investigations that when the polymer cement added with aminoalcohol, if necessary aggregate, is used as an aqueous paint, the effect for preventing rust and proofing water on surface of metal or mineral structures is improved, coating film properties, such as compression strength, bending strength and adhesion of the coated film are improved and the adhesion to a top coat is improved and the present invention has been accomplished.

A first aspect of the present invention consists in a synthetic resin composition to be added to cement or mortar obtained by mixing 0.05~5 parts by weight based on 100 parts by weight of solid content of resin of a synthetic resin emulsion, of an aminoalcohol having 2~8 carbon atoms.

A second aspect of the present invention consists in an aqueous paint composition obtained by adding a synthetic resin emulsion and if necessary aggregate and a coloring agent to cement in an amount of 5~60 parts by weight of solid content of resin in the resin emulsion based on 100 parts by weight of cement, said synthetic resin emulsion being obtained by mixing 0.05~5 parts by weight based on 100 parts by weight of resin solid content in a synthetic resin emulsion, of an aminoalcohol.

A third aspect of the present invention consists in a method for coating the aqueous primer paint composition described in the above second aspect of the present invention.

The synthetic resin emulsion in the present invention involves acrylic synthetic resin emulsion, vinyl acetate synthetic resin emulsion, styrene butadiene latex, acrylonitrile butadiene latex, epoxy resin emulsion and the like. Particularly, emulsions of alkyl esters of acrylic acid or methacrylic acid in which an alkyl group has 1~8 carbon atoms, copolymers thereof, vinyl acetate and the polymers, ethylene-vinyl acetate copolymer, vinyl acetate-versatic acid-vinyl ester copolymer, vinyl propionate-vinyl acetate copolymer are preferable. As an epoxy resin emulsion, use may be made of a uniform dispersion of condensate of bisphenol A and epichlorohydrin in water. As an epoxy resin hardening agent, use may be made of usual epoxy resin hardening agent, such as polyamides, amine aducts and the like.

The term "aminoalcohols having 2~8 carbon atoms" used herein means primary amine compounds of ethanol, propanol, butanol, pentanol, hexanol, heptanol, octanol and the derivatives thereof and for example, if shown by propanol derivatives, 1-amino-2-propanol, 3-amino-1-propanol, 2-amino-2-methyl-1-propanol, 2-amino-1-propanol, aminoalcohols of 1-butanol, 2-methyl-1-propanol, 2-butanol, 2-methyl-2-propanol are preferable in view of high waterproof, adhesion and rust prevention.

The reason why the aminoalcohol is limited to 0.05~5 parts by weight based on 100 parts by weight of resin solid content in the synthetic resin emulsion is that when said amount is less than 0.05 part by weight, the effect for preventing rust and waterproofing, which is the object of cement or mortar, can not be obtained, while the amount exceeding 5% by weight is not preferable in view of economy and the preferable amount is 0.2~1.5 parts by weight. The aminoalcohol may be used in combination of two or more aminoalcohols, if necessary.

Cements in the present invention involve various Portland cements, alumina cements, white cements and the like and the synthetic resin composition according to the present invention is used in the range of 5~60% by weight of solid resin based on 100 parts by weight of cement and the preferable range is 10~40 parts by weight.

Aggregates, if necessary added involve silica powders, siliceous sand, talc, mica, terra abla, diatomaceous earth, kaolin, sand, colored sand, calcium carbonate, usual plastering materials, such as organic and inorganic fibers and the like. In addition, if necessary, coloring pigments, such as titanium oxide, carbon black, red iron oxide etc., water soluble high molecular weight thickener, such as methyl cellulose, anti-foaming agent, fungicide etc. may be added. In general, to the synthetic resin emulsion are added an aminoalcohol, a coating film assistant, an anti-foaming agent and a small amount of the other additives to prepare a mixture and upon using, cement and various aggretates are mixed therein by a mixer and water is added thereto be obtain the required viscosity.

The addition of the aminoalcohol to the synthetic resin emulsion is effected by adding said alcohol to the emulsion having a solid content of resin being 30~50% but in some using object, a small amount of additives, such as a coating film assistant (cs-12 made by Chisso Co. Ltd., or Texanol made by Eastman Chemical Co.

Ltd.), an anti-foaming agent, a crack preventing agent, a fungicide, a low temperature stabilize and the like are added to prepare a liquid synthetic resin emulsion, and then the prepared emulsion is mixed with cement by a cement mixer to prepare a cement coating composition. If necessary, an aggregate is added thereto.

When cement or mortar added with the synthetic resin composition is applied on a mineral or wood structure surface, contamination on the coated surface owing to red rust caused by corrosion of bolts, iron frame, nails and the like is not caused. By applying such composition on a metal structure surface as a primer for purpose of the rust prevention, the contamination of the top coat surface owing to red rust can be prevented. Thus, the composition may be used as a rust preventing paint of metal structures and further used as a decorative layer or a primer of metal, mineral or wood structures. The composition is applied by spray coating, roller coating, brushing or trowelling in an appropriate amount depending upon the object. In the case of rust preventing coating, the coated amount is about 0.2 kg/m$^2$~3 kg/m$^2$. In the case of spray coating, the composition is applied in one time spraying in such an extent that the coated film does not hang down and the thickness of the coated film depends upon the grain diameter and the amount of aggregates and is preferred to be more than 400 $\mu$m. The compression strength under the curing period of 7 days at 35° C. following to the standard specification is 122.4 kg/cm$^2$ and the compression strength and the bending strength after leaving stand for 28 days at 20° C. and a relative humidity of 80% after water curing for 7 days are 222 kg/cm$^2$ and 81.3 kg/cm$^2$ respectively, which are greatly improved as compared with the respective standard value of 110 kg/cm$^2$ and 35 kg/cm$^2$ defined in JASS 23 and the waterproof is excellent. As mentioned above, when the primer paint according to the present invention is applied on surface of mineral structures, such as concrete plate, concrete block, concrete wall, mortar wall, slate plate, stone material etc.; wood plates, such as veneer plate, hardboard plate or wood structures; metal structures, such as iron sheet etc, the coated films having excellent rust prevention, waterproof and adhesion can be formed and the adhesion to top coat is excellent and physical properties of the coated film, such as impact resistance, bending resistance, crack prevention, compression strength and bending strength are improved, so that when comparing with the case where a top coat is applied on the conventionally used cement primer, the more excellent top coat surface is obtained.

As top coat paints, use may be made of vinyl enamel paints, such as vinyl chloride enamel paint; acrylic enamel paint; epoxy enamel paint; various synthetic resin emulsion paints consisting of natural rubber, synthetic rubber latex, such as styrene-butadiene copolymeric rubber, synthetic resin emulsions, such as polyvinyl acetate, polyvinyl chloride, acrylic resin etc. and an extender pigment and a color pigment; hardening synthetic resin emulsion paints, such as epoxy resin; inorganic paint using sodium silicate or silica sol. as a binder, or top coat paints generally used on inner or outer surfaces of mineral structures, metal structures or wood structure surface.

These top coat paints are applied by various coating methods, such as brush coating, roller coating, spray coating and the like to form various finished surfaces, such as smooth surface, sand wall-like, uneven pattern, double layer pattern and the like. The adhesion to the primer layer is very high and the coated film is not disengaged until the substrate coated with the primer layer is broken and the primer layer is broken.

When the coating is effected on polished mild steel sheet, rusts depositing on metal surface and aged coated film are carefully removed conventionally by means of sander, wire brush, file and the like and oil and dusts are removed with a thinner and then the coating is carried out. To the composition shown in the following Example 3, (3) Coating test is added 0.6~0.8 part by weight of water. The obtained mixture is applied in two times under spraying pressure of 4~5 kg/cm$^2$ with a spray gun having a nozzle diameter of 5 mm in a sprayed amount of about 700 g/m$^2$. In this case, the applied composition is hardened at 20° C., 65% RH in 1 hour to such an extent that the hardening is judged by finger touch and fully hardened in 24 hours. A decoration finishing using an alkali resistant paint can be effected after drying for about 24 hours and the coating time can be shortened as compared with the conventional primer coating. Accordingly, the paint composition is effective as heavy duty anti-corrosive paint for various marine structures, such as warship deck, hatch, ballast tank; metal parts, such as cranes, iron towers, tanks, bridges, power transmission towers, railway vehicles, road vehicles and the like; iron structures, such as iron pipes, steel pipes, guard rails, road iron plates, sewage iron plates, steel sheet piles, temporary pipes, elevators, steel sashes etc. Thus, by applying the paint composition on warship deck, road iron plate and the like in uneven form, the paint composition can be used as a slip preventing paint.

The water penetration prevention is high, so that the waterproof and durability are more excellent as compared with the prior paint for coating of metal or mineral structures, such as underground structures, tunnel, sewage etc. or outside of structures, such as cement, mortar etc.

The following examples are given for the purpose of illustration of this invention and are not intended as limitations thereof.

EXAMPLE 1

(1) Preparation of synthetic resin composition to be added to cement.

To 100 parts by weight of a composition consisting of 82.5 parts by weight of 45% of resin solid content of Boncoat 4500 (made by Dainippon Ink Co. Ltd.) as an acrylic ester synthetic resin emulsion, 1.6 parts by weight of CS-12 of a film forming assistant, 1.4 parts by weight of tributyl phosphate of an anti-foaming agent, 13.6 parts by weight of methyl cellulose (2% aqueous solution), 0.45 part by weight of a fungicide, and 0.45 part by weight of ethylene glycol was added 0.1, 0.5, 0.9, 5 or 10 parts by weight of 1-amino-2-propanol (purity 90±3%) respectively and the resulting mixture was homogeneously mixed to prepare five kinds of synthetic resin compositions (a), (b), (c), (d) and (e) to be added to cement.

(2) Preparation of cement mixture

|  | Part by weight |
| --- | --- |
| White Portland cement | 30 |
| Silica powder (grain size 100 mesh) | 26.7 |
| Siliceous sand #7 (average grain size 150 mesh) | 35.6 |
| Zeorite | 6 |
| Calcium stearate | 0.5 |

-continued

| | Part by weight |
|---|---|
| Sodium naphthalenesulfonate-formalin condensate | 1.2 |
| | 100 |

The above described mixture was homogeneously mixed.

(3) Rust preventing test 20 parts by weight of the above described synthetic resin composition (1), 80 parts by weight of the above described cement mixture (2) and 10~15 parts by weight of water were thoroughly mixed to prepare paint compositions (a), (b), (c), (d) and (e).

A comparative sample was prepared by using a synthetic resin composition in which 1-amino-2-propanol was not added to the above described synthetic resin composition (1).

The thus formed six paint compositions were uniformly applied on surface of polished mild steel plate having a thickness of 0.6 mm, a length of 15 cm and a breadth of 7.5 cm in an amount of 1 kg/m² respectively to prepare test plates. An aqueous brine spraying test (JIS-K5400) was carried out under condition of 35° C., 90 hours and 200 hours with respect to each test plate. The obtained results are shown in the following table.

| | Test No. | | | | | |
|---|---|---|---|---|---|---|
| Time | Comparative | (a) | (b) | (c) | (d) | (e) |
| 90 hours | Spot rust forms | Not vary | Not vary | Not vary | Not vary | Not vary |
| 200 hours | Rust forms | Spot rust forms | Not vary | Not vary | Not vary | Not vary |

EXAMPLE 2

Instead of 1-amino-2-propanol in the synthetic resin composition (1) in Example 1, 0.9 part by weight of 3-amino-1-propanol (purity 90±3%), 2-amino-2-methyl-1-propanol (purity 90±3%), or 2-amino-1-propanol (purity 90±3%) was added to prepare three synthetic resin compositions according to the present invention and the same rust preventing test as in Example 1 was carried out. The obtained results are shown in the following table.

| | Additive | | |
|---|---|---|---|
| Time (hr) | 3-amino-1-propanol | 2-amino-2-methyl-1-propanol | 2-amino-1-propanol |
| 90 | Not vary | Not vary | Not vary |
| 500 | Not vary | Not vary | Not vary |
| 1000 | Not vary | Not vary | Not vary |

EXAMPLE 3

(1) Preparation of synthetic resin composition to be added to cement.

82.0 parts by weight of 45% of resin solid content of Boncoat 4500 (made by Dainippon Ink Co. Ltd.) as an acrylic resin emulsion was homogeneously mixed with 13.7 parts by weight of 2% Natrosol 250 HR (cellulose derivative, made by Hercurries Co. Ltd.), 0.8 part by weight of 2-amino-2-methyl-1-propanol (concentration 90%), 1.5 parts by weight of a fatty acid ester anti-foaming agent, 0.4 part by weight of a fungicide of Vestcide F (made by Dainippon Ink Co. Ltd.) and 1.6 parts by weight of CS-12 (made by Chisso Co. Ltd.) of a film forming assistant.

(2) Preparation of cement mixture

| | part by weight |
|---|---|
| Portland cement | 30 |
| Silica powder #100 (average grain size 50 mesh) | 12 |
| Silica powder #200 (average grain size 270 mesh) | 11.5 |
| Microdol | 12 |
| Polyethylene fiber (length 0.7 mm) | 0.35 |
| Merment (F-10) (made by Showa Denko Co., Ltd.) | 0.15 |
| Siliceous sand #7 (average grain size 150 mesh) | 17.00 |
| Siliceous sand #8 (average grain size 200 mesh) | 17.00 |
| Total | 100 |

The above described mixture was homogeneously mixed.

(3) Coating test

The above described synthetic resin composition (1) was mixed with the above described cement mixture (2) in a mixture ratio by weight of 1:4 and water was added thereto to prepare a primer paint having about 80% of water according to the present invention.

As a comparative sample, a primer paint having the same composition as described above except for no addition of 2-amino-2 methyl-1-propanol was prepared.

Each primer paint was applied on surface of polished mild steel plate having a thickness of 0.6 mm, a length of 15 cm and a breadth of 7.5 cm in an amount of 1.6 kg/cm² by means of a spray gun to prepare two test plates. The thus formed test plates were measured with respect to the crack resistance, compression strength, bending strength, waterproof, resistance against quoeous brine, dried film thickness and adhesion under the conditions as described in the following Table 1.

TABLE 1

| | | Test results | |
|---|---|---|---|
| Test item | Test condition | Present invention | Comparative |
| Crack resistance | JASS23-M 103 | Not vary | Not vary |
| Compression Strength | JASS23-M 103 (after 7 days at 35° C.) | 122 kg/cm² | 120 kg/cm² |
| | JASS23-M 103 (*1) | 220 kg/cm² | 210 kg/cm² |
| Bending strength | JASS-M 103 (1*) | 81 kg/cm² | 78 kg/cm² |
| Water proof | Dipping for 45 days at 20° C. | Not vary | Not vary |
| Aqueous brine spray test | JIS K-54000 | Not vary after 1500 hours | Rust foams after 1000 hours |
| Dried film thickness | After 7 days at 35° C. | 800 μm | 800 μm |
| Adhesion | Single axial stretch | 11.0 kg/cm² | 10.5 kg/cm² |

Note:
(*1) 28 (*1)...28 days after curing at 20° C. and a relative humidity of 80% after water curing for 7 days

EXAMPLE 4

The following test was carried out following to the test process of cement waterproofing agent for construction, JISA 1404. Test plate was prepared by filling 1-5 mortar (cement: river sand=1:5) to a center portion of a doughnut-formed plate of 1-3 mortar (cement: river sand=1:3) having an outer diameter of 15 cm, an inner diameter of 5 cm and a thickness of 4 cm. The primer paint described in Example 3 was applied on one side surface of said doughnut plate in various coated amounts shown in Tables 2 and 3 and cured at 35° C. for 7 days. On the upper and lower surfaces of this test plate were applied rubber packings having a thickness of 1 cm, at the center of which a perforated hole having a diameter of 5 cm is provided. The test was made with respect to the coated surface and the non-coated surface under the conditions disclosed in the following Tables 2 and 3.

As comparative tests, a test plate coated with the comparative primer paint described in Example 3 and a noncoated plate were prepared. The obtained results are shown in Tables 2 and 3.

TABLE 2

Water penetration test with respect to the coated surface

| Water pressure kg/cm$^2$ | Dried film thickness ($\mu$m) | Test result (ml/hr) Present invention | Comparative Coated plate | Non-coated plate |
|---|---|---|---|---|
| 0.5 | 0 | — | — | more than 250 |
| 0.5 | 600 | 33.0 | 33.5 | — |
| 0.5 | 1000 | 0 | 0 | — |
| 0.5 | 1150 | 0 | 0 | — |
| 1.0 | 0 | — | — | more than 500 |
| 1.0 | 600 | 34.2 | 34.5 | — |
| 1.0 | 900 | 0 | 0 | — |
| 1.0 | 1150 | 0 | 0 | — |
| 2.0 | 0 | — | — | — |
| 2.0 | 600 | 83.0 | 85.0 | — |
| 2.0 | 900 | 6.1 | 8.3 | — |
| 2.0 | 1350 | 1.0 | 1.0 | — |

TABLE 3

Water penetration test with respect to the non-coated surface

| Water pressure kg/cm$^2$ | Dried film thickness ($\mu$m) | Test result (ml/hr) Present invention | Comparative coated plate | non-coated plate |
|---|---|---|---|---|
| 0.5 | 0 | — | — | more than 250 |
| 0.5 | 1000 | 8.0 | 8.2 | — |
| 0.5 | 1250 | 6.5 | 6.8 | — |
| 1.0 | 0 | 0 | — | more than 500 |
| 1.0 | 1000 | 26.5 | 27.5 | — |
| 1.0 | 1300 | 17.5 | 17.0 | — |
| 2.0 | 0 | — | — | — |
| 2.0 | 1050 | Broken | Broken | — |
| 2.0 | 1200 | 17.5 | 18.5 | — |

What is claimed is:

1. Rust preventing synthetic resin compositions to be added to cement or cement mortar comprising 0.05-5 parts by weight of a primary alkanol-amine having 2 to 8 carbon atoms based on 100 parts by weight of resin solid content in a synthetic resin emulsion.

2. The rust preventing synthetic resin compositions as claimed in claim 1, wherein the solid content of the primary alkanol-amine is 0.2~1.5 parts by weight.

3. The rust preventing synthetic resin compositions as claimed in claim 1, wherein the synthetic resin emulsion is acrylic synthetic resin emulsion, vinyl acetate synthetic resin emulsion, styrene butadiene latex, acrylonitrile butadiene latex and epoxy resin emulsion.

4. Rust preventing aqueous paint compositions comprising a synthetic resin emulsion and cement or cement mortar, if necessary aggregate and a coloring agent in an amount of 5~60 parts by weight of resin solid content in the resin emulsion based on 100 parts by weight of cement, said synthetic resin emulsion containing 0.05~5 parts by weight based on 100 parts by weight of resin solid content in the synthetic resin emulsion, of a primary alkanol-amine having 2 to 8 carbon atoms.

5. The rust preventing aqueous paint compositions as claimed in claim 4, wherein the amount of the resin solid content in the synthetic resin composition is 10~40 parts by weight.

6. The rust preventing aqueous paint compositions as claimed in claim 4, wherein the synthetic resin emulsion is acrylic synthetic resin emulsion, vinyl acetate synthetic resin emulsion, styrene butadiene latex, acrylonitrile butadiene latex and epoxy resin emulsion.

7. The rust preventing aqueous paint compositions as claimed in claim 4, wherein the cement is Portland cement, alumina cement and white cement.

* * * * *